(12) United States Patent
Kleingärtner et al.

(10) Patent No.: US 6,614,832 B1
(45) Date of Patent: Sep. 2, 2003

(54) METHOD OF DETERMINING ELECTRODE LENGTH AND BATH LEVEL IN AN ELECTRIC ARC FURNACE

(76) Inventors: Peter Kleingärtner, Koenitz (DE); Bernd Griessbach, Rudolstadt (DE)

( * ) Notice: Subject to any disclaimer, the term of this patent is extended or adjusted under 35 U.S.C. 154(b) by 0 days.

(21) Appl. No.: 09/980,358
(22) PCT Filed: May 31, 1999
(86) PCT No.: PCT/DE99/01669
§ 371 (c)(1), (2), (4) Date: Mar. 11, 2002
(87) PCT Pub. No.: WO00/74442
PCT Pub. Date: Dec. 7, 2000

(51) Int. Cl.[7] .............................................. H05B 7/148
(52) U.S. Cl. ...................................................... 373/105
(58) Field of Search ................................ 373/2, 42, 50, 373/60, 70, 102, 104, 105

(56) References Cited

U.S. PATENT DOCUMENTS

| | | | |
|---|---|---|---|
| 3,614,284 A | | 10/1971 | Scheidig |
| 4,429,401 A | * | 1/1984 | Avicola ........................ 373/12 |
| 4,435,818 A | * | 3/1984 | Stenzel et al. ............... 373/104 |
| 5,590,151 A | | 12/1996 | Forestier |
| 5,621,751 A | * | 4/1997 | Williamson et al. ......... 373/104 |
| 5,638,398 A | * | 6/1997 | Ikitsu et al. ................. 373/100 |
| 6,115,405 A | * | 9/2000 | Brunner ........................ 373/105 |

* cited by examiner

Primary Examiner—Tu Ba Hoang

(57) ABSTRACT

A method for the continuous determination of the distance between an electrode tip and level of a bath in an electric arc furnace so as to be able to exactly determine electric energy consumption per tonne of scrap actually melted, electrode wear and the residual liquid bath present in the electric arc furnace after tapping.

20 Claims, 1 Drawing Sheet

METHOD OF DETERMINING ELECTRODE LENGTH AND BATH LEVEL IN AN ELECTRIC ARC FURNACE

CROSS REFERENCE TO RELATED APPLICATION

This application is a 371 application of International Patent Application No. PCT/DE99/01669 filed May 31, 1999.

FIELD OF THE INVENTION

The present invention relates to a method for continuously determining the distance between a tip of an electrode and a steel bath level in an electric arc furnace.

BACKGROUND OF THE INVENTION

Currently, in electric arc furnaces, the level of the electrode tip at a particular time during the melting process is not known with sufficient accuracy. Moreover, the level of the steel bath at the end of a melting process is also not known with sufficient accuracy.

Among other things, the inability to know the level of the electrode tip and the level of the steel bath results from the fact that the electrodes having varying lengths, there are different clamping heights of the electrodes and different electrode consumptions.

OBJECT AND SUMMARY OF THE INVENTION

It is therefore an object of the invention to provide a method with which the above-described disadvantages can be largely minimized.

This objective is accomplished by carrying out two special length measurements and subsequently evaluating the results for the purpose of continuously determining the distance between a tip of the electrode and a level of the bath of the preceding melt in the electric arc furnace.

More specifically, in a method in accordance with the invention, a length measuring system capable of providing a length measurement which correlates to a height of the electrode in the furnace is provided along with an optical measuring system capable of generating a horizontal beam path which is arranged at a predetermined vertical distance from a reference point. A first length measurement of the electrode is performed at the end of each melt conducted in the electric arc furnace by moving the electrode toward the steel bath until a predetermined stopping criterion of the electrode tip is reached and then determining and storing a first value of the length measuring system. A second length measurement is performed by moving the electrode in a direction away from the steel bath until the electrode tip interrupts the horizontal beam path generated by the optical measuring system and then determining and storing a second value of the length measuring system. The distance between the electrode tip and the level of the steel bath can be determined from the first and second values.

DETAILED DESCRIPTION OF THE INVENTION

Figure 1:
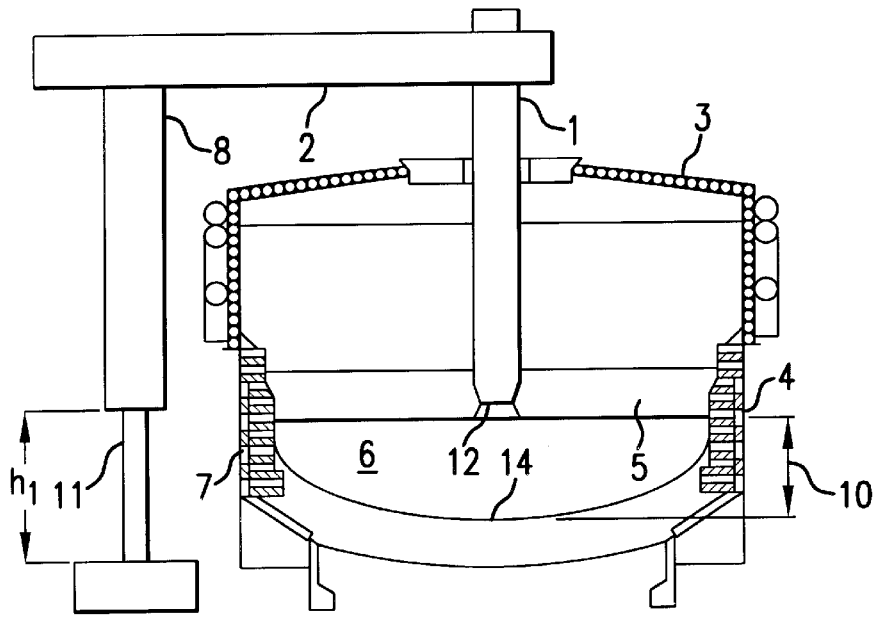
FIG. 1 is a cross-sectional view of an electric arc furnace in which the method in accordance with the invention is applied.

Referring to FIG. 1, the method in accordance with the invention is used in conjunction with a furnace vessel 4 which is operatively covered by a furnace lid 3 and includes a refractory lining 7. A steel bath 6 is formed inside the vessel 4 at the bottom and slag 5 covers the steel bath 6. The level of the bath 6 is designated 10, i.e., the height of the steel bath 6 from a bottom of the interior of the vessel 4 (reference point 14) to the upper surface of the steel bath 6.

Outside of the vessel 4, there is an electrode-lifting cylinder 8 connected to an electrode arm 2 which extends over the vessel 4. An electrode 1 is connected to the electrode arm 2 and enters into the interior of the vessel 4. The electrode 1 has an electrode tip 12. A length measuring system or electrode lift 11 is associated with the electrode-lifting cylinder 8 and the height ($h_1$ and $h_2$) of the length measuring system 11 is used to determine the length of the electrode 1 as described below.

Figure 2:
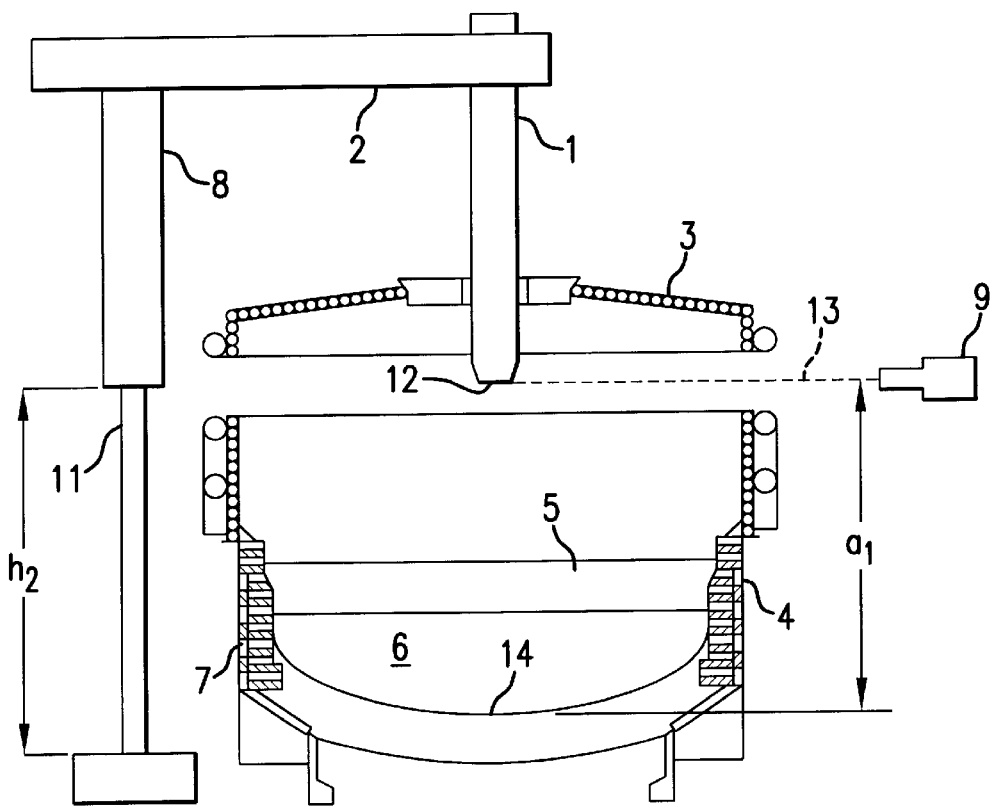
FIG. 2 is a schematic view showing the optical measuring system used in a method in accordance with the invention.

Referring now to FIG. 2, an optical measuring system 9 is also provided and generates a beam path 13. The distance between the reference point 14 and the beam path 13 provides a variable $a_1$ which is used to determine the length of the electrode 1 as discussed below.

In a method in accordance with the invention, a first measurement is made towards the end of each melt. The electrode tip 12 is moved in the direction of the steel bath 6 by suitably varying the control variables for the furnace voltage and current. When a specified stopping criterion is reached, the electrode-lifting cylinder 8 is in the position shown in FIG. 1 and the actual value $h_1$ of the length measuring system, electrode lift 11, is stored and the measuring process is terminated. The stopping criterion is defined by a signal behavior of the control variables for furnace voltage and furnace current, which occurs identically for each measurement. Accordingly, the distance between the electrode tip 12 and the level 10 of the steel bath 6 is approximately constant for each measurement.

A second measurement is made with the furnace lid 3 swung out to expose the interior of the vessel 4, as shown in FIG. 2. By means of a suitable automated system the electrode tip 12 is moved to a known, fixed distance from the reference point 14. This fixed distance is defined by the horizontal beam path 13 of the optical measuring system 9, such as a pyrometer. As soon as the electrode tip 12 has interrupted the beam path 13 of the optical measuring system 9, the electrode 1 is raised. When the beam path 13 no longer is interrupted, the actual value ($h_2$) of the length measuring system, the electrode lift 11, is stored.

The bath level 10 is calculated using the equation:

$$\text{bath level} = a_1 - (h_2 - h_1).$$

The distance between the electrode tip 12 and the bath level 10 of the preceding melt is calculated using the equation:

$$\text{distance} = a_1 - (h_2 - \text{actual value of length measuring systems}) - \text{bath level} + \text{correction for electron consumption between 2 measurements}.$$

Accordingly, it is possible to determine the electrode consumption in centimeters per molten scrap content of a basket and the level of the steel bath 6 at the end of a melt.

The proposed method is suitable for all electric arc furnaces, especially for d.c. electric arc furnaces.

For carrying out the first measurement, when the proposed method is used with a three-phase electric arc furnace, an electrode 1 must be immersed in the steel bath 6 and the described measurement must be carried out with a second electrode.

Under the condition that the tapping weight can be determined accurately, the method developed enables the technological characteristics, related to the respective melt, in a sump furnace to be stated accurately.

Accordingly, the following, for example, can be stated concerning the respective melt:

consumption of electric energy per ton of scrap actually melted:

residual amount in the furnace after tapping: and exact consumption of electrode.

The above information and knowledge of the height, at which the electrode tip 12 is in the furnace at any time, makes it possible to analyze, optimize, automate and control the process extensively. Some of the optimizations and automations that become possible are listed below:

optimizing and automating the melting phases;

optimizing and automating the overheating phase and the field strength;

optimizing the sump amount with the aim of minimizing the energy consumption and maximizing the output;

minimizing consumption of the refractory materials; and minimizing the proportion of entrained slag during tapping to improve the metallurgical work during the pan handling, especially the desulfurization.

What is claimed is:

1. A method for continuously determining the distance between a tip of an electrode and a level of a steel bath in an electric arc furnace, comprising the steps of:

providing a length measuring system capable of providing a length measurement which correlates to a height of the electrode in the furnace;

arranging an optical measuring system capable of generating a horizontal beam path at a predetermined vertical distance from a reference point;

performing a first length measurement of the electrode at the end of each melt conducted in the electric arc furnace by moving the electrode toward the steel bath until a predetermined stopping criterion of the electrode tip is reached and then determining and storing a first value of the length measuring system, and performing a second length measurement by moving the electrode in a direction away from the steel bath until the electrode tip interrupts the horizontal beam path generated by the optical measuring system and then determining and storing a second value of the length measuring system, the distance between the electrode tip and the level of the steel bath being determinable from the first and second values.

2. The method of claim 1, wherein the furnace is a three-phase electric arc furnace, further comprising the step of immersing an additional electrode in the steel bath at the time of the first measurement.

3. The method of claim 1, wherein the electrode is moved toward the steel bath during the first length measurement by varying control variables for voltage and current of the furnace.

4. The method of claim 3, further comprising the step of defining the stopping criterion of the electrode tip based on the control variables for the voltage and current of the furnace.

5. The method of claim 4, wherein the stopping criterion is defined such that the distance between the electrode tip and the level of the steel bath is substantially constant for each measurement.

6. The method of claim 1, further comprising the steps of providing the furnace with a lid covering a vessel and swinging the lid out from a position above the vessel when performing the second length measurement.

7. The method of claim 1, wherein the optical measuring system is a pyrometer.

8. The method of claim 1, further comprising the step of determining the level of the steel bath by subtracting a difference between the second and first values from the distance between the optical measuring system and the reference point.

9. The method of claim 8, wherein the distance between the electrode tip and the level of the steel bath is determined by subtracting the determined level of the steel bath and a difference between the second value and an operative value of the length measuring system from the distance between the optical measuring system and the reference point and further adding a correction factor for electron consumption between two successive measurements.

10. The method of claim 1, wherein the furnace is a DC electric arc furnace.

11. The method of claim 1, further comprising the step of coupling the electrode to an electrode arm connected to an electrode-lifting cylinder associated with the length measuring system.

12. A method for continuously determining the distance between a tip of an electrode and a level of a steel bath in an electric arc furnace, comprising the steps of:

providing an electrode-lifting cylinder movable relative to a first reference point to move the electrode relative to the steel bath;

arranging an optical measuring system capable of generating a horizontal beam path at a predetermined vertical distance from a second reference point;

performing a first length measurement of the electrode at the end of each melt conducted in the electric arc furnace by moving the electrode toward the steel bath until a predetermined stopping criterion of the electrode tip is reached and then determining and storing a first value representative of a distance the electrode has been lifted by the electrode-lifting cylinder relative to the first reference point, and performing a second length measurement by moving the electrode in a direction away from the steel bath until the electrode tip interrupts the horizontal beam path generated by the optical measuring system and then determining and storing a second value representative of a distance the electrode has been lifted by the electrode-lifting cylinder relative to the first reference point, the distance between the electrode tip and the level of the steel bath being determinable from the first and second values.

13. The method of claim 12, wherein the furnace is a three-phase electric arc furnace, further comprising the step of immersing an additional electrode in the steel bath at the time of the first measurement.

14. The method of claim 12, wherein the electrode is moved toward the steel bath during the first length measurement by varying control variables for voltage and current of the furnace.

15. The method of claim 14, further comprising the step of defining the stopping criterion of the electrode tip based on the control variables for the voltage and current of the furnace.

16. The method of claim 15, wherein the stopping criterion is defined such that the distance between the electrode tip and the level of the steel bath is substantially constant for each measurement.

17. The method of claim 12, further comprising the steps of providing the furnace with a lid covering a vessel and swinging the lid out from a position above the vessel when performing the second length measurement.

18. The method of claim 12, further comprising the step of determining the level of the steel bath by subtracting a difference between the second and first values from the distance between the optical measuring system and the second reference point.

19. The method of claim 17, wherein the distance between the electrode tip and the level of the steel bath is determined by subtracting the determined level of the steel bath and a difference between the second value and an actual value representative of a distance the electrode is operatively moved by the electrode-lifting cylinder relative to the first reference point from the distance between the optical measuring system and the second reference point and further adding a correction factor for electron consumption between two successive measurements.

20. The method of claim 12, further comprising the step of coupling the electrode to an electrode arm connected to the electrode-lifting cylinder.

* * * * *